R. FAUTSCH.
COMBINED STEERING AND PROPELLING MEANS FOR VEHICLES.
APPLICATION FILED SEPT. 21, 1910.
1,006,925.
Patented Oct. 24, 1911.
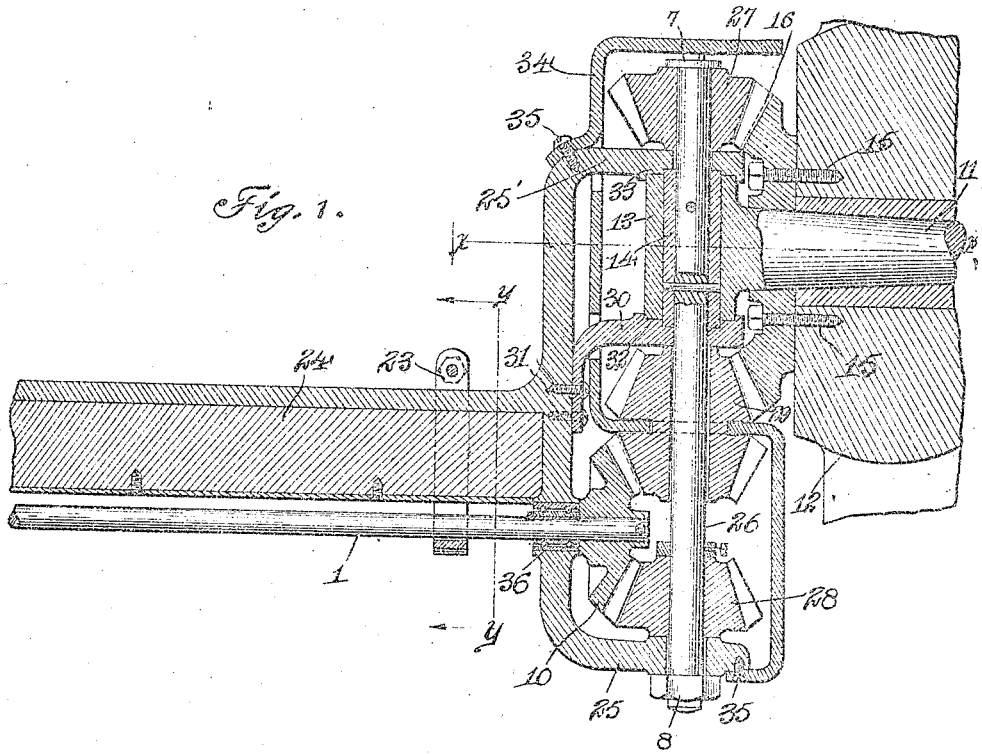
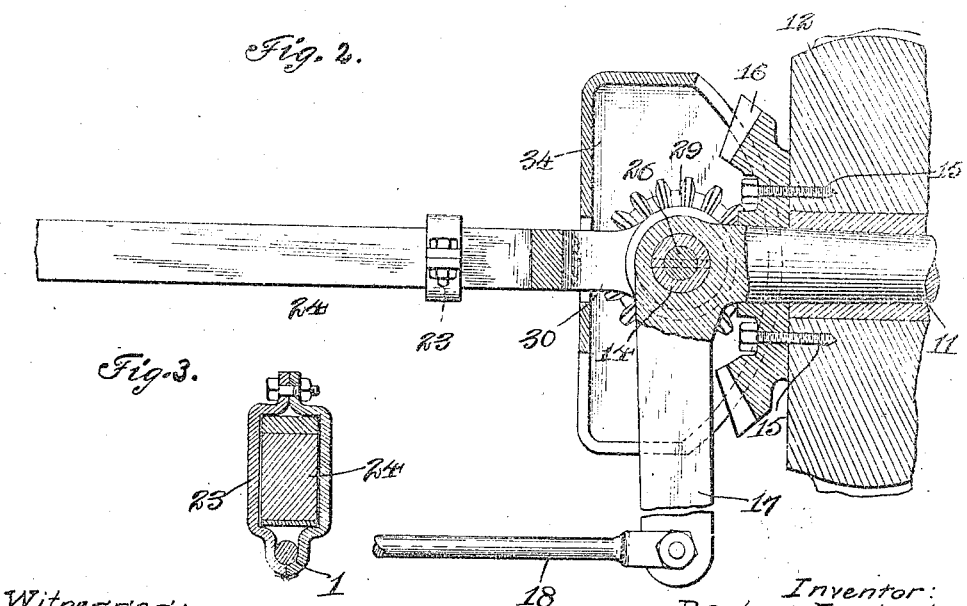
Witnesses:
M. L. Lessin
A. A. Olson
Inventor:
Rochus Fautsch
By Joshua R. H. Potts
His Attorney.

UNITED STATES PATENT OFFICE.

ROCHUS FAUTSCH, OF CHICAGO, ILLINOIS.

COMBINED STEERING AND PROPELLING MEANS FOR VEHICLES.

1,006,925.

Specification of Letters Patent. Patented Oct. 24, 1911.

Application filed September 21, 1910. Serial No. 583,111.

*To all whom it may concern:*

Be it known that I, ROCHUS FAUTSCH, a citizen of the United States, residing at Chicago, county of Cook, and State of Illinois, have invented certain new and useful Improvements in Combined Steering and Propelling Means for Vehicles, of which the following is a specification.

My invention relates to improvements in combined steering and propelling means for vehicles and has for its object the production of means of this character especially adapted for employment in the front axle of a self-propelled vehicle so as to capacitate the wheels carried by said axle for service both for steering and driving.

A further object is the provision of means as mentioned which will be of durable and economical construction, and efficient in operation.

Other objects will appear hereinafter.

With these objects in view my invention consists in a combined steering and propelling mechanism characterized as above mentioned and in certain details of construction and arrangement of parts all as will be hereinafter fully described and more particularly pointed out in the appended claims.

My invention will be more readily understood by reference to the accompanying drawings forming a part of this specification, and in which—

Figure 1 is a central vertical section of apparatus embodying my invention. Fig. 2 is a horizontal section taken on line *x—x* of Fig. 1. Fig. 3 is a transverse section taken on line *y—y* of Fig. 1.

In the preferred form of construction as illustrated the axle 1 is shown mounted in a strap bearing 23 at the under side of a supporting beam 24. Fork arms 25 and 25' are formed integral with each other, the same being rigidly secured to the extremity of said beam. Rotatably mounted in said fork arms 25 and 25' is a pin 26. Fixed to said pin adjacent the upper and lower ends thereof are beveled pinions 27 and 28 respectively, and loosely mounted thereon intermediate said pinions 27 and 28 is a double pinion 29. The pinion 28 and the lower portion of a pinion 29 mesh with the gear 10 fixed to the outer end of the axle 1, the upper portion of said pinion 29 and the pinion 27 meshing with the beveled gear 16 fixed to the inner side of the wheel 12. The spindle 11 carrying the wheel 12 is, as in the other two forms, formed at its inner end with a tubular bearing portion 13 which is mounted for oscillation upon the pin 26; the bushing 14 being interposed between the adjacent surfaces of said pin and bearing. An additional arm 30 is interposed between the arms 25 and 25', the inner end of said arm 30 being secured by means of screws 31. Said arm 30 is arranged in alinement with the arms 25 and 25' and serves, together with the arm 25', as a means of preventing longitudinal movement of the spindle bearing 13 upon the pin 26, the inner surfaces of said arms being provided with annular recesses 32 and 33 respectively for the reception of the extremities of said bushing 14 and bearing portion 13. A housing 34 secured in position by screws 35 is shown inclosing the various gears and pinions, such housing serving merely as a protection or shield for the latter. Also, the axle 1 is shown mounted in a ball-bearing 36 provided in the fork arm 25. With this construction it will be seen that, through the medium of the pinion 28 the pin 26 will be rotated by the axle 1, and that therefore the pinion 27, which is fixed to said pin, will also be rotated. Said pinion 27 together with the pinion 29 which meshes with the gear 10 establish a driving connection with the wheel 12.

With the construction shown and described it will be seen that the wheel is so connected to its axis that the same, upon rotation of the latter, will be driven thereby and that at the same time, said wheel will be free for rocking or oscillation in its bearings in order to effect the steering of the vehicle. The construction set forth presents a connection of great durability and effectiveness and at the same time one of simplicity and economy, and because of its simplicity a construction not susceptible to readily becoming inoperative.

While I have shown what I deem to be the preferred forms of connection I do not wish to be limited thereto as there might be various changes made in the details of construction and the arrangement of parts described without departing from the spirit of the invention comprehended within the scope of the appended claims.

Having described my invention what I claim as new and desire to secure by Letters Patent is:

1. The combination with a wheel, of a beveled gear connected to drive said wheel, a pin adjacent said gear, a driving axle arranged below the axis of said wheel, a beveled gear on said axle, and three beveled pinions on said pin, the uppermost of said pinions meshing with the upper portion of said wheel driving gear, the lowermost of said pinions meshing with the lower portion of the gear on the axle, and the intermediate pinion being a double pinion and meshing with both of said gears, substantially as described.

2. The combination of a driving axle, a nonrevoluble spindle and a stationary fork arranged at the extremity of said axle in a common vertical plane therewith, a vertically disposed pin mounted in said fork and having its axis included in said plane, one end of said spindle being mounted for horizontal oscillation upon said pin, a wheel revolubly mounted upon the free end of said spindle, a beveled gear fixed to the extremity of said axle, a beveled gear fixed to the inner side of said wheel concentrically with said spindle, and three beveled pinions mounted upon said pin, the endmost thereof being fixed to said pin, the same meshing each with one of said beveled gears, the intermediate of said pinions being loose upon said pin, the same meshing with both of said gears, substantially as described.

In testimony whereof I have signed my name to this specification in the presence of two subscribing witnesses.

ROCHUS FAUTSCH.

Witnesses:
  HELEN F. LILLIS,
  JOSHUA R. H. POTTS.